(12) United States Patent
Olyunin et al.

(10) Patent No.: US 10,447,088 B2
(45) Date of Patent: Oct. 15, 2019

(54) APPARATUS AND METHOD FOR WIRELESS POWER TRANSFER

(71) Applicant: SAMSUNG ELECTRONICS CO., LTD., Suwon-si (KR)

(72) Inventors: Nikolay Nikolayevich Olyunin, Perm (RU); Mikhail Nikolayevich Makurin, Arkhangelsk (RU); Artem Rudolfovich Vilenskiy, Moscow (RU); Alexander Nikolayevich Khripkov, Lobnya (RU); SungBum Park, Seoul (KR); DoWon Kim, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 15/648,590

(22) Filed: Jul. 13, 2017

(65) Prior Publication Data
US 2018/0019619 A1    Jan. 18, 2018

(30) Foreign Application Priority Data

Jul. 14, 2016  (RU) ................................ 2016128764
May 22, 2017  (KR) ........................ 10-2017-0062977

(51) Int. Cl.
*H02J 50/12*       (2016.01)
*H02J 50/80*       (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02)

(58) Field of Classification Search
CPC .. H02J 50/12; H02J 50/80; H02J 50/40; H02J 7/025
See application file for complete search history.

(56) References Cited

U.S. PATENT DOCUMENTS 9,787,114 B2     10/2017  Jeong et al.
2011/0148215 A1*  6/2011  Marzetta ................. H02J 5/005
                                                          307/104

(Continued)

FOREIGN PATENT DOCUMENTS

KR     10-2016-0007332 A    1/2016
RU        2 487 452 C1      7/2013
WO         2016010362 A1    1/2016

OTHER PUBLICATIONS

Communication dated May 12, 2017, issued by the Russian Patent Office in counterpart Russian Application No. 2016128764.
(Continued)

*Primary Examiner* — Robert L Deberadinis
(74) *Attorney, Agent, or Firm* — Sughrue Mion, PLLC (57) ABSTRACT

A device that wirelessly transfers power to an external device is provided. The device for wirelessly transferring power to an external device includes a resonant circuit including an adaptive circuit including at least one variable capacitor and a first inductor inductively coupled to the external device and configured to transfer the power to the external device using inductive coupling, and a first direct current (DC) power supply configured to apply a DC voltage to the adaptive circuit based on a control signal, wherein capacitance of the at least one variable capacitor is adjusted based on the DC voltage applied to the adaptive circuit.

18 Claims, 6 Drawing Sheets

(51) Int. Cl.
*H02J 7/02* (2016.01)
*H02J 50/40* (2016.01)

(56) References Cited

U.S. PATENT DOCUMENTS

| | | |
|---|---|---|
| 2012/0293118 A1 | 11/2012 | Kim et al. |
| 2013/0082536 A1 | 4/2013 | Taylor et al. |
| 2014/0152251 A1 | 6/2014 | Kim et al. |
| 2014/0265615 A1 | 9/2014 | Kim et al. |
| 2016/0013657 A1 | 1/2016 | Jeong et al. |
| 2016/0308397 A1* | 10/2016 | Jung ................. H02J 50/12 |

OTHER PUBLICATIONS

Communication dated Jun. 29, 2017, issued by the Russian Patent Office in counterpart Russian Application No. 2016128764.

* cited by examiner

APPARATUS AND METHOD FOR WIRELESS POWER TRANSFER

CROSS-REFERENCE TO RELATED APPLICATIONS

This application claims the benefit of Russian Patent Application No. 2016128764, filed on Jul. 14, 2016, in the Russian Patent Office, and Korean Patent Application No. 10-2017-0062977, filed on May 22, 2017, in the Korean Intellectual Property Office, the disclosures of which are incorporated herein in their entireties by reference.

BACKGROUND

1. Field

The present disclosure relates to methods and apparatuses for transferring power wirelessly through inductive coupling.

2. Description of the Related Art

A variety of techniques that utilize inductive wireless power transfer to transfer power wirelessly have been proposed.

In an inductive wireless power transfer system, in order to prevent negative effects on peripheral devices and a power transfer system due to an increase in transfer efficiency of power, control of a transfer power amount, or electromagnetic properties of a wireless power transfer technology, technology for controlling a wireless power transfer system is needed.

Conventionally, although a technique for controlling an inductive wireless power transfer system using a switching circuit or a controllable DC-DC converter has been proposed, efficiency of an entire system is reduced and system costs are increased.

SUMMARY

Provided are methods and apparatuses for transferring power wirelessly through inductive coupling and, more particularly, wireless power transfer apparatuses and methods for adjusting transfer power.

Additional aspects will be set forth in part in the description which follows and, in part, will be apparent from the description, or may be learned by practice of the presented embodiments.

According to an aspect of an exemplary embodiment, a device for wirelessly transferring power to an external device includes a resonant circuit including an adaptive circuit including at least one variable capacitor and a first inductor inductively coupled to the external device and configured to transfer the power to the external device using inductive coupling; and a first direct current (DC) power supply configured to apply a DC voltage to the adaptive circuit based on a control signal, wherein capacitance of the at least one variable capacitor is adjusted based on the DC voltage applied to the adaptive circuit.

The device may further include a control circuit configured to generate the control signal and apply the generated control signal to the first DC power supply.

The device may further include a first current sensor configured to measure current flowing in the first inductor, wherein the control circuit is further configured to receive information about the measured current flowing in the first inductor and generate the control signal based on the received information.

The control circuit may include a signal receiver, wherein the first inductor is inductively coupled to a second inductor of the external device, and wherein the control circuit is further configured to receive data regarding current flowing in the second inductor through the signal receiver and generate the control signal based on the received data.

The control circuit may include a signal receiver, and wherein the control circuit is further configured to receive, through the signal receiver, data regarding current flowing in a load of the external device and generate the control signal based on the received data.

The device may further include a second DC power supply; and a driving circuit configured to receive DC power output from the second DC power supply and supply alternating current (AC) power to the resonant circuit.

The driving circuit may be configured to convert the received DC power into the AC power.

The device may further include at least one of a voltage sensor measuring an output voltage of the second DC power supply and a second current sensor measuring an output current, wherein the control circuit is further configured to receive at least one piece of information among information about the measured output voltage and the measured output current and generate the control signal based on the received at least one piece of information.

The at least one variable capacitor may be in series or in parallel to the first inductor.

The at least one variable capacitor may be one of a ferroelectric capacitor and a liquid crystal capacitor.

According to an aspect of another exemplary embodiment, a wireless power transfer method in which a wireless power transfer device including a resonant circuit including an adaptive circuit including at least one variable capacitor and a first inductor, and a first DC power supply wirelessly transfers power to an external device, the method including applying a generated control signal to the first DC power supply, applying a DC voltage output from the first DC power supply to the adaptive circuit based on the generated control signal, adjusting a capacitance of the at least one variable capacitor based on the DC voltage, and transferring wireless power through the first inductor based on the adjusted capacitance.

The applying of the generated control signal to the first DC power supply may include measuring current flowing in the first inductor, and generating the control signal based on information about the measured current flowing in the first inductor.

The applying of the generated control signal to the first DC power supply may include receiving data regarding current flowing in the second inductor through the external device inductively coupled to the first inductor, and generating the control signal based on the received data.

The applying of the generated control signal to the first DC power supply may include receiving data regarding current flowing in a load of the external device, and generating the control signal based on the received data.

The wireless power transfer device may further include a driving circuit configured to receive DC power output from the second DC power supply and supply AC power to the resonant circuit, wherein the applying of the generated control signal to the first DC power supply includes measuring at least one of an output voltage and an output current of the second DC power supply, and generating the control signal based on at least one piece of information among data regarding the measured output voltage and information about the measured output current.

The at least one variable capacitor may be in series or in parallel to the first inductor.

The at least one variable capacitor may be one of a ferroelectric capacitor and a liquid crystal capacitor.

According to an aspect of another exemplary embodiment, a computer program product includes a non-transitory computer readable recording medium, wherein the non-transitory computer readable recording medium includes a computer program command for performing a power transfer method performed by a wireless power transfer device including resonant circuit including an adaptive circuit including at least one variable capacitor and a first inductor, and a first DC power supply, and wirelessly transferring power to an external device, and wherein the power transfer method includes applying a generated control signal to the first DC power supply, applying a DC voltage output from the first DC power supply to the adaptive circuit based on the generated control signal, adjusting capacitance of the at least one variable capacitor based on the DC voltage, and transferring wireless power through the first inductor based on the adjusted capacitance.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Wireless power supply typically uses inductive wireless power transfer (WPT) to wirelessly convey electrical power. A typical inductive WPT system may include an inductive power supply that uses a primary coil to wirelessly transfer power in the form of a varying electromagnetic field (transferring part) and a remote device that uses a secondary coil to convert the energy of electromagnetic field into electrical power (receiving part).

In such systems, adaptive WPT control is advantageous to adjust operating parameters of the WPT system over time in order to improve the efficiency of power transfer, and/or to control the amount of the transferred power, and/or to avoid operating in certain modes that may be adverse for the power transfer system as such and to surrounding devices taking into account the electromagnetic nature of the wireless power transfer technique.

An inductive WPT system may typically consist of a transferring (Tx) part and a receiving (Rx) part. For example, the Tx part may include at least one Tx inductor and a circuit for driving current in the Tx inductor. The Rx part may include at least one Rx inductor and a rectifying circuit.

The Tx part may be connected to a direct current (DC) or alternating current (AC) current and voltage supply, for example, a voltage source and/or a current source. It may be typically necessary to implement control capabilities in a wireless power transfer system in order to adjust the amount of transferred power during variations of input voltage and/or input current, coupling between Tx and Rx parts due to changes in mutual arrangement of the Tx and Rx parts, load pick-up current, or other operating conditions.

This may be necessary, for example, in wireless charging devices designed to charge devices with different power consumption and/or multiple devices at the same time, as well as in charging devices where a size of a charging area is greater than the maximum size of devices to be charged.

Various approaches may be utilized for achieving the control capability in a WPT system. These approaches include the use of controllable DC-DC converters in Tx and Rx parts, implementing an adjustment capability in the circuit for driving current in the Tx inductor, and application of adaptive matching techniques. To expand the control capabilities, several approaches may be used simultaneously.

As an approach for implementing the control capability in the WPT system, an approach for adjusting current in the Tx inductor may consist of coupling the Tx inductor to the driving circuit within a resonant circuit and varying the switching frequency in the driving circuit. The resonant circuit may represent a series or parallel resonant tank, or a more complex combination of inductors and capacitors. To adjust current in the Tx inductor, the frequency dependence of the resonant circuit characteristics may be used to adjust current in the Tx inductor.

This approach is disclosed in several power transfer designs according to the standard of Wireless Power Consortium (Qi Standard), System Description, Wireless Power Transfer, Volume I: Low Power. Part 1: Interface Definition, Version 1.1.2. June 2013 (hereinafter referred to as [1]), and is also described in patent application US 2013/0082536 A1 (Taylor J. B., Moor C. J., Baarman D. W., Mollema S. A., Moes B. C., Kuyvenhoven N. W., Nibbelink M. J., System and method for improved control in wireless power supply systems, published on Apr. 4, 2013) (hereinafter referred to as [2]).

The disadvantage of this approach is in relation to a variable switching frequency in the driving circuit, and therefore, the varying current frequency in the Tx inductor.

Typically, in WPT systems the inductance of the Rx inductor may be compensated by a respective capacitor or a matching circuit in order to eliminate the phase shift between the induced voltage and the current in the Rx inductor. Elimination of this phase shift may be necessary to maximize the efficiency of power transfer or, the performance factor at power transfer.

For example, inductance of the Rx inductor may be compensated by a single capacitor or a matching circuit only at a certain frequency. If the operating frequency is varied, the power transfer efficiency will also vary due to the impedance variation in the circuit and, therefore, a phase shift between the induced current and the induced voltage flowing in the Rx inductor may occur.

In addition, according to the requirements of a standard for wireless power transfer (developed by working group AirFuel Alliance, formerly Alliance for Wireless Power), a relatively narrow range of operating frequencies is allocated for current in the Tx inductor; and an impossibility to go beyond this range means this approach cannot be applied. Therefore, in WPT systems according to this standard a constant switching frequency should be used in the driving circuit.

Another approach for adjusting current in a Tx inductor is to vary input DC voltage using a controllable DC-DC converter.

This approach is also used in several power transfer designs in the standard [1], and is described in patent application [2]. The disadvantage of this approach consists in the need for a separate DC-DC converter with controllable output voltage prior to the circuit driving current in the Tx inductor. This DC-DC converter reduces the overall system efficiency and increases system costs. In addition, the adjustment capabilities in this approach may be insufficient for stable operation of the WPT system in all possible operating conditions.

International publication WO 2016/010362 A1 (N. N. Olyunin, A. G. Chernokalov, "Method for control in wireless power transfer systems") discloses another approach which consists of control of current in the Tx inductor by varying the difference in duty cycles in complementarily turned-on switches in bridge-type circuits. The disadvantage of this approach is the complexity of its implementation at operating frequencies above 1 MHz. This complexity is associated with increasing complexity of driving circuits with variable duty cycles as the frequency increases.

According to an embodiment, the frequency dependence of characteristics of the resonant circuit for adjusting current in the Tx inductor may be used. For example, the operating frequency of the driving circuit in the Tx part may remain constant. Instead of varying the operating frequency, properties of the resonant circuit (in particular, its impedance) may be changed. The impedance of the resonant circuit may be changed by varying the capacitance of one or more voltage-controlled variable (tunable) capacitors that are parts of the resonant circuit.

To vary the capacitance of the variable capacitors, an additional DC voltage supply with controllable variable output voltage may be required. However, this voltage supply does not increase the system costs significantly, since it does not transfer power.

Therefore, the power transfer efficiency may be improved in a WPT system designed to charge various devices (including multiple devices at the same time) without increasing its complexity and size.

An embodiment may provide more flexible positioning of a receiving (charged) device relative to a charging device, enable increasing the charging area, reduce the power consumption of the WPT system, increase the charging speed and the tolerance to variations in input voltage, and reduce the dissipated power and heating of both the charged and charging device, thereby improving their reliability, safety and extending the lifetime.

Hereinafter, embodiments will be described in detail with reference to the accompanying drawings so that those of ordinary skill in the art may easily carry out the present disclosure. However, the present disclosure may be embodied in many different forms and is not limited to the embodiments described herein. In order to clearly illustrate the present disclosure in the drawings, portions which are not related to the description have been omitted, and like reference numerals have been assigned to similar portions throughout the specification.

The present invention will be described in detail with reference to the accompanying drawings.

Figure 1:
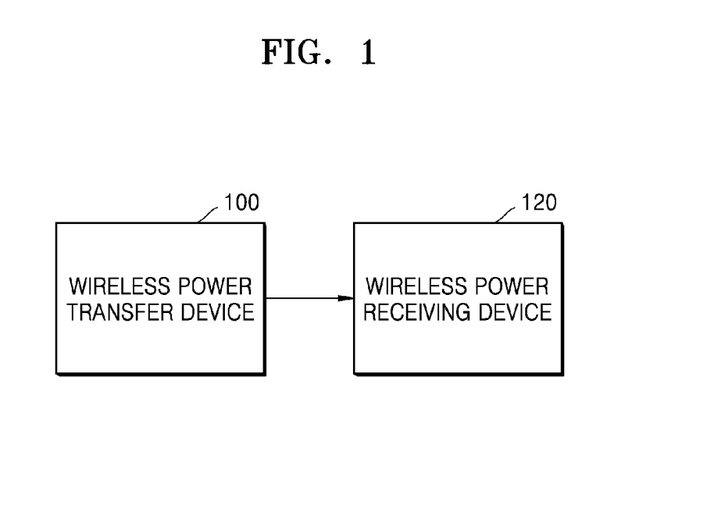
FIG. 1 is a schematic diagram of a wireless power transfer system according to an exemplary embodiment.

FIG. 1 is a schematic diagram of a wireless power transfer system according to an exemplary embodiment.

The wireless power transfer system may include a wireless power transfer device 100 and a wireless power receiving device 120.

The wireless power transfer device 100 according to an exemplary embodiment may inductively transfer power to the wireless power receiving device 120. For example, a transfer inductor included in the wireless power transfer device 100 may be inductively coupled with a reception inductor included in the wireless power reception device 120. In addition, the wireless power transfer device 100 may transfer power to the wireless power receiving device 120 using inductive coupling.

The wireless power transfer device 100 may include a first DC power supply, a variable capacitor, and a transfer inductor.

The wireless power transfer device 100 may adjust the power transferred to the wireless power receiving device 120. For example, the wireless power transfer device 100 may adjust the power transferred to the wireless power receiving device 120 by adjusting an amplitude of current flowing in the transfer inductor.

For example, the wireless power transfer device 100 may adjust DC voltage applied to the variable capacitor from the first DC power supply. In addition, capacitance of the variable capacitor may be adjusted based on the DC voltage supplied from the first DC power supply. Furthermore, as the capacitance of the variable capacitor is adjusted, the current flowing in the transfer inductor may be adjusted. Also, as the current flowing in the transfer inductor is adjusted, the power transferred to the wireless power receiving device 120 may be adjusted.

Figure 2:
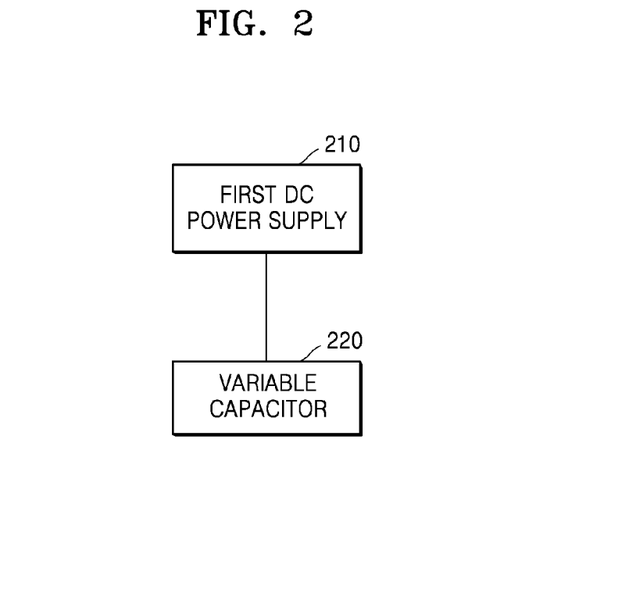
FIG. 2 is a block diagram of a wireless power transfer device according to an exemplary embodiment.

FIG. 2 is a block diagram of the wireless power transfer device 100 according to an exemplary embodiment.

Referring to FIG. 2, the wireless power transfer device 100 may include a first DC power supply 210 and at least one variable capacitor 220.

The first DC power supply 210 according to an exemplary embodiment may be configured to apply DC voltage to the at least one variable capacitor 220 based on a control signal.

The first DC power supply 210 according to an exemplary embodiment may be a controllable DC voltage source. For example, the first DC power supply 210 may be a current controlled DC voltage source, and the control signal may be a current signal. As another example, the first DC power supply 210 may be a voltage controlled DC voltage source, and the control signal may be a voltage signal.

The first DC power supply 210 according to an exemplary embodiment may be configured to receive the control signal. Furthermore, the first DC power supply 210 may be configured to adjust output DC voltage based on the control signal.

The first DC power supply 210 according to an exemplary embodiment may be configured to apply the output DC voltage to the at least one variable capacitor 220.

The at least one variable capacitor 220 according to an exemplary embodiment may be a voltage variable capacitor. A capacitance of the at least one variable capacitor 220 according to an exemplary embodiment may be adjusted based on the DC voltage supplied from the first DC power supply 210.

As the capacitance of at least one variable capacitor 220 according to an exemplary embodiment is adjusted, impedance of a resonant circuit including at least one variable capacitor and a transfer inductor may be adjusted. Furthermore, as the impedance of the resonant circuit is adjusted, current flowing in the transfer inductor may be adjusted. As the current flowing in the transfer inductor according to an exemplary embodiment is adjusted, power transferred to the wireless power receiving device 120 may be adjusted.

To obtain the required capacitance in the resonant circuit, a set of constant capacitors may be used as capacitors in an adaptive circuit. Each of the constant capacitors may be connected to a switching circuit assigned to each of the constant capacitors. The switching circuit may determine based on its state, for example, an open/closed state, whether the constant capacitor connected thereto will make a contribution to the total impedance of the resonant circuit. The circuit using the constant capacitor, however, may be either relatively large and sophisticated or not very accurate because of a discreteness of the contribution of each capacitor to the impedance. In addition, switching elements must withstand relatively large currents and voltages, which makes it necessary to use complex and costly switching elements.

In light of the above disadvantages of using a set of constant capacitors and a switching circuit, the use of DC voltage controlled variable capacitors is preferred. The wider the adjustment range of each variable capacitor, the smaller the number of capacitors required for the adaptive circuit and the less its size, complexity and losses, and the higher the reliability.

Use of variable capacitors involves the need to use with them a DC voltage supply with a controllable variable output voltage, but its presence has substantially no effect on the overall complexity and characteristics of the system because of its low power and absence of losses, and small dimensions in relation to the aforementioned array of gate circuits. In addition, it should be noted that the increase in the number of variable capacitors in the adaptive circuit from one to two and more does not require the use of a DC voltage supply for each capacitor, that is, an additional increase in the capacitance adjustment range does not lead to a significantly complex and costly system.

The at least one variable capacitor 220 according to an exemplary embodiment may include a non-linear dielectric material. As the DC voltage applied to the at least one variable capacitor 220 according to an exemplary embodiment is adjusted, the magnetic permeability of the dielectrics constituting the at least one variable capacitor 220 may vary. A ratio of maximum capacitance to minimum capacitance of the at least one variable capacitor 220 according to an exemplary embodiment may be 1.4 or greater. For example, at least one variable capacitor 220 may include, but is not limited to, ferroelectric capacitors, liquid crystal capacitors, and the like.

Various embodiments of the present disclosure may be applied to a wireless power transfer system having variable coupling between a variable load, a variable input voltage, or a power transferor, for example, the wireless power transfer device 100 and a power receiver, for example, the wireless power receiving device 120.

In particular, various embodiments of the present disclosure provide a wireless charger capable of charging a mobile device with different power consumption, such as a wearable device, a smartphone, and a tablet computer, a wireless charger that allows devices to be charged to be relatively freely positioned with a charging area of a size larger than the maximum size of the wireless charger, and a wireless charger that allows charging of a plurality of devices at the same time.

Figure 3:
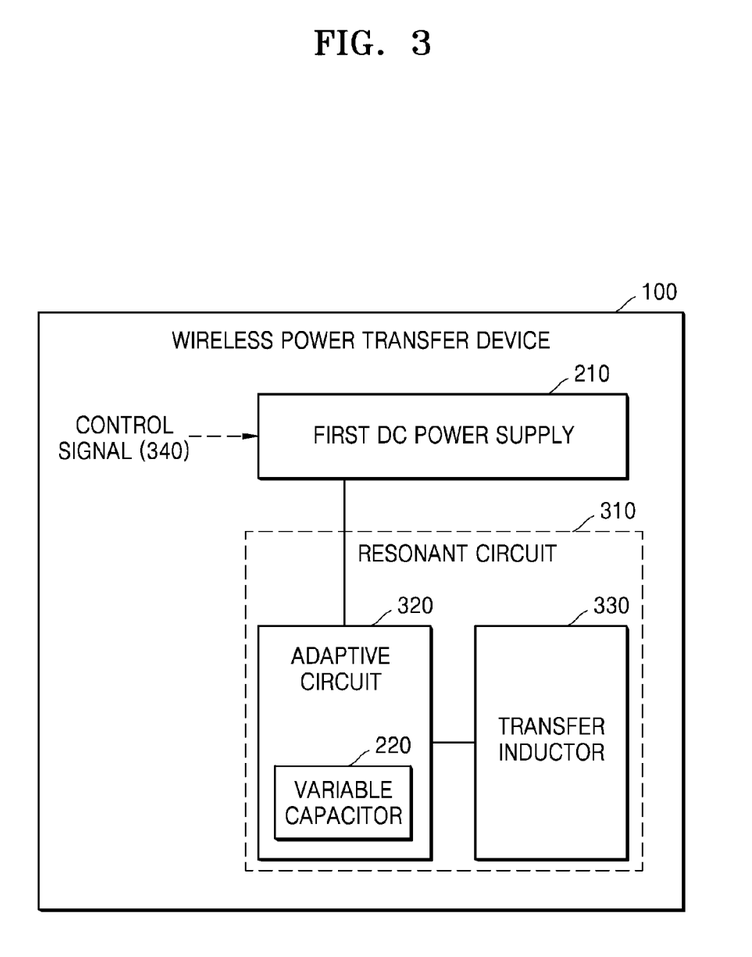
FIG. 3 is a block diagram of a wireless power transfer device according to an exemplary embodiment.

FIG. 3 is a block diagram of the wireless power transfer device 100 according to an exemplary embodiment.

Referring to FIG. 3, the wireless power transfer device 100 may include a first DC power supply 210 and a resonant circuit 310. The resonant circuit 310 may also include an adaptive circuit 320 that includes at least one variable capacitor 220 and at least one transfer inductor 330.

The first DC power supply 210 and the resonant circuit 310 according to an exemplary embodiment may be electrically connected. For example, the resonant circuit 310 may be connected to an output terminal of the first DC power supply 210.

The first DC power supply 210 according to an exemplary embodiment may be configured to apply DC voltage to the adaptive circuit 320 based on a control signal 340.

The first DC power supply 210 according to an exemplary embodiment may be configured to receive the control signal 340. For example, the first DC power supply 210 may be configured to receive the control signal 340 from another component of the wireless power transfer device 100. The control signal 340 according to an exemplary embodiment may be determined based on at least one of information about current and/or voltage within the wireless power transfer device 100 and information about current and/or voltage within the wireless power transfer device 100 to adjust the output voltage of the first DC power supply 210.

The first DC power supply 210 according to an exemplary embodiment may be configured to adjust the output DC voltage based on the control signal 340. For example, the first DC power supply 210 may be configured to increase or decrease the output DC voltage based on the control signal 340.

The first DC power supply 210 according to an exemplary embodiment may be configured to apply an output DC voltage to the adaptive circuit 320. For example, the first DC power supply 210 may be configured to apply the output DC voltage to the variable capacitor 220 included in the at least one adaptive circuit 320.

The first DC power supply 210 according to an exemplary embodiment may be configured to apply a DC voltage for adjusting the capacitance of the at least one variable capacitor to the adaptive circuit. For example, the first DC power supply 210 may be configured to adjust capacitance of at least one variable capacitor so that a DC voltage for adjusting impedance of the resonant circuit 310 including the at least one variable capacitor may be applied to the adaptive circuit 320.

As described above, the resonant circuit 310 according to an exemplary embodiment may include the adaptive circuit 320 and the at least one transfer inductor 330. In addition, the adaptive circuit 320 may include the at least one variable capacitor 220.

The adaptive circuit 320 according to an exemplary embodiment may include the one or more variable capacitors 220. In addition, the adaptive circuit 320 may include a fixed reactive element such as an inductor, a fixed capacitor, or a transformer.

The adaptive circuit 320 according to an exemplary embodiment may include the plurality of variable capacitors 220. For example, the plurality of variable capacitors 220 may be connected in series or in parallel.

The at least one variable capacitor 220 according to an exemplary embodiment may be connected in series or in parallel with the transfer inductor 330.

The impedance of the resonant circuit 310 according to an exemplary embodiment may be determined based on the impedance of the adaptive circuit 320 and the impedance of the at least one transfer inductor 330. For example, the impedance of the resonant circuit 310 may be determined based on the impedance of the at least one variable capacitor 220 included in the adaptive circuit 320 and the impedance of the at least one transfer inductor 330.

The adaptive circuit 320 according to an exemplary embodiment may be configured to adjust the capacitance of the at least one variable capacitor 220 based on the DC voltage applied to the adaptive circuit 320.

The capacitance of the at least one variable capacitor 220 according to an exemplary embodiment may be adjusted based on the DC voltage supplied to the at least one variable capacitor 220. For example, the capacitance of the at least one variable capacitor 220 may be adjusted based on the DC voltage supplied from the first DC power supply 210.

For example, the greater the DC voltage supplied to the at least one variable capacitor 220, the greater the capacitance of the at least one variable capacitor 220. As another example, the smaller the DC voltage supplied to the at least one variable capacitor 220, the higher the capacitance of the at least one variable capacitor 220.

The at least one transfer inductor 330 according to an exemplary embodiment may be configured to transfer power to the wireless power receiving device 120 through inductive coupling with the wireless power receiving device 120.

For example, the at least one transfer inductor 330 may be inductively coupled to a receiving inductor of the wireless power receiving device 120. Also, the at least one transfer inductor 330 may be inductively coupled to a plurality of receiving inductors of a plurality of wireless power receiving devices.

For example, the at least one transfer inductor 330 may transfer power to the wireless power receiving device 120 through inductive coupling. For example, as AC current flows through the transfer inductor 330, power may be transferred in the form of electromagnetic energy to the receiving inductor of the wireless power receiving device 120. For example, the transferred electromagnetic energy may be converted to electrical energy in the receiving inductor. For example, as the transferred electromagnetic energy is converted to the electrical energy in the receiving inductor, AC current may flow in the receiving inductor.

Also, as the amplitude of the AC current flowing in the at least one transfer inductor 330 is adjusted, the power transferred to the wireless power receiving device 120 may be adjusted.

Figure 4:
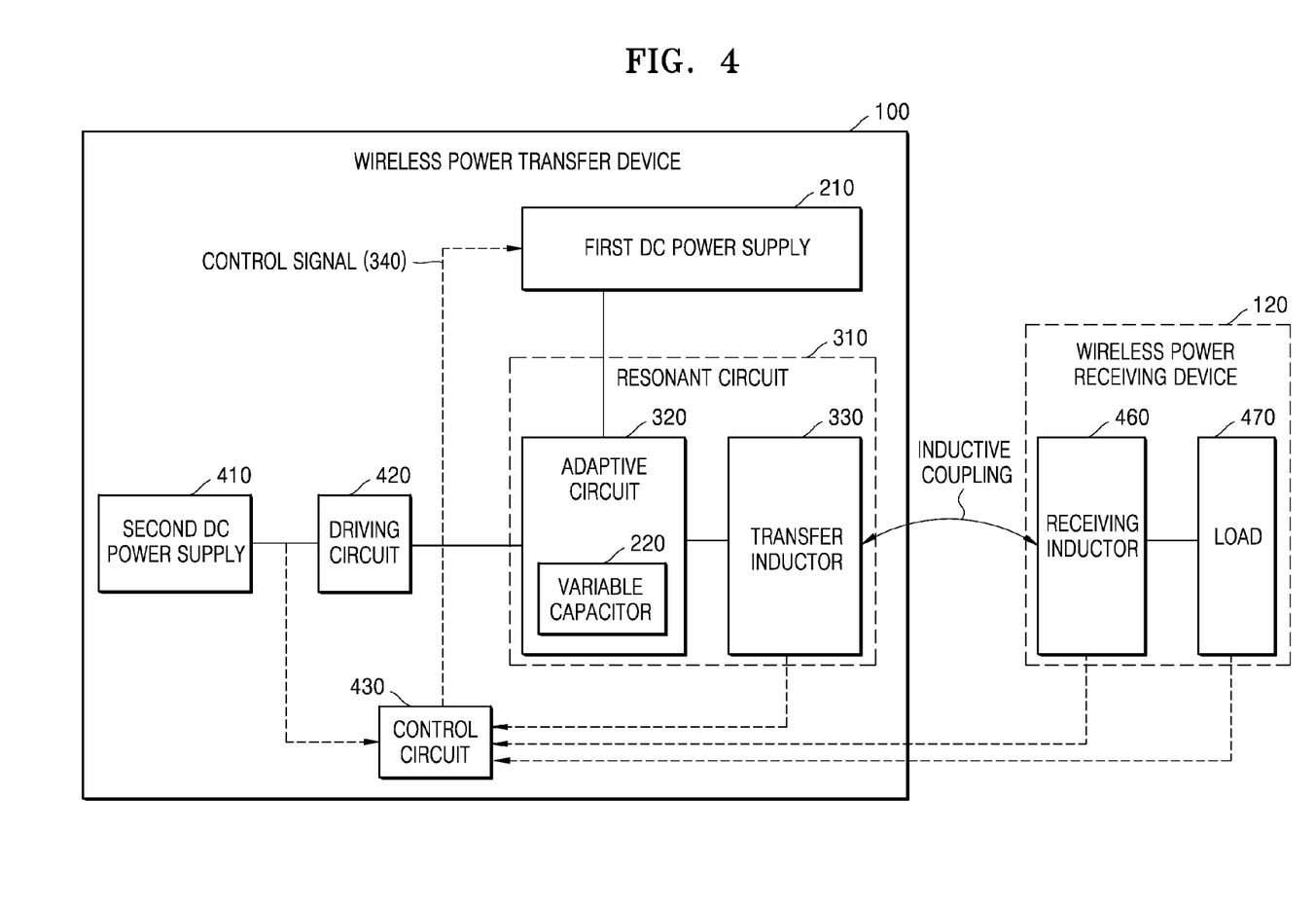
FIG. 4 is a diagram illustrating a wireless power transfer system according to an exemplary embodiment.

FIG. 4 is a diagram illustrating a wireless power transfer system according to an exemplary embodiment.

Referring to FIG. 4, the wireless power transfer system according to an exemplary embodiment may include the wireless power transfer device 100 and the wireless power receiving device 120.

The wireless power transfer device 100 may be, for example, a charger. The wireless power receiving device 120 may be, for example, a device to be charged.

Although only one wireless power receiving device 120 is shown in FIG. 4, a wireless power transferring system according to an exemplary embodiment may include a plurality of wireless power receiving devices.

In the following description of FIG. 4, a redundant description with the description of FIG. 3 will be omitted.

The wireless power transfer device 100 according to an exemplary embodiment may include a second DC power supply 410, a driving circuit 420, a control circuit 430, the first DC power supply 210, and the resonant circuit 310. In addition, the resonant circuit 310 according to an exemplary embodiment may include the adaptive circuit 320 including the at least one variable capacitor 220 and the transfer inductor 330.

In addition, the wireless power receiving device 120 according to an exemplary embodiment may include a receiving inductor 460 and a load 470.

The second DC power supply 410 according to an exemplary embodiment may be configured to apply DC power to the drive circuit 420. The second DC power supply 410 according to an exemplary embodiment may be configured to apply an output DC voltage or an output DC current to the drive circuit 420.

The driving circuit 420 according to an exemplary embodiment may be configured to apply AC power to the resonant circuit 310 based on the DC power supplied from the second DC power supply 410.

For example, the driving circuit 420 may be configured to apply AC voltage or current to the resonant circuit 310. The drive circuit 420 may apply the AC current to the resonant circuit 310 so that the AC current flows in the transfer inductor 330. For example, the driving circuit 420 may be configured to apply the AC voltage or the AC current of a predetermined driving frequency to the resonant circuit 310.

The driving circuit 420 according to an exemplary embodiment may be configured to convert the DC power received from the second DC power supply 410 into AC power. For example, the driving circuit 420 may be configured to convert a DC voltage or a DC current received from the second DC power supply 410 into an AC voltage or an AC current.

The driving circuit 420 according to an exemplary embodiment may be configured to apply the converted AC power to the resonant circuit 310. For example, the driving circuit 420 may be configured to apply the converted AC voltage or current to the resonant circuit 310.

The control circuit 430 according to an exemplary embodiment may be configured to generate the control signal 340 and apply the generated control signal 340 to the first DC power supply 210.

The wireless power transfer device 100 according to an exemplary embodiment may further include a current sensor (not shown) for measuring the current flowing in the transfer inductor 330. The control circuit 430 may be configured to receive information about the current flowing in the transfer inductor 330 from the current sensor of the transfer inductor 330. For example, the control circuit 430 may be configured to receive information related to amplitude of the current flowing in the transfer inductor 330 from the current sensor of the transfer inductor 330.

The wireless power transfer device 100 according to an exemplary embodiment may further include a voltage sensor (not shown) for measuring a voltage of the transfer inductor 330. For example, the control circuit 430 may be configured to receive information about an inductance voltage of the transfer inductor 330.

The wireless power transfer device 100 according to an exemplary embodiment may further include a power sensor (not shown) for measuring power consumed by the transfer inductor 330. The control circuit 430 may be configured to receive information about the measured power consumed by the transfer inductor 330.

The wireless power transfer device 100 according to an exemplary embodiment may include a voltage sensor (not shown) for measuring the output voltage of the second DC power supply 410. For example, the wireless power transfer device 100 may include a voltage sensor for measuring the output voltage applied to the drive circuit 420 from the second DC power supply 410. For example, the control circuit 430 may be configured to receive information about the measured output voltage.

The wireless power transfer device 100 according to an exemplary embodiment may include a current sensor (not shown) for measuring the output current of the second DC power supply 410. For example, the wireless power transfer device 100 may include a current sensor for measuring the output current applied to the drive circuit 420 from the second DC power supply 410. The control circuit 430 may be configured to receive information about the measured output current.

The wireless power transfer device 100 according to an exemplary embodiment may include a power sensor (not shown) that measures the output power of the second DC power supply 410. For example, the wireless power transfer device 100 may include a power sensor that measures the output power applied to the drive circuit 420 from the second DC power supply 410. The control circuit 430 may be configured to receive information about the measured output power.

The control circuit 430 according to an exemplary embodiment may include a signal receiver (not shown) and may be configured to apply the control signal 340 generated based on the received data from the wireless power receiving device 120 through the signal receiver to the first DC power supply 410.

The wireless power receiving device 120 according to an exemplary embodiment may further include a current sensor (not shown) that measures the current flowing in the receiving inductor 460 or the load 470. The control circuit 430 may be configured to receive data about the current flowing in the receiving inductor 460 or the load 470 through the signal receiver.

The wireless power receiving device 120 according to an exemplary embodiment may further include a voltage sensor (not shown) that measures a voltage of the receiving inductor 460 or the load 470. The control circuit 430 may be configured to receive data regarding the voltage of the receiving inductor 460 or the load 470 through the signal receiver.

The wireless power receiving device 120 according to an exemplary embodiment may further include a power sensor (not shown) that measures power consumed by the receiving inductor 460 or the load 470. The control circuit 430 may be configured to receive data regarding the power consumed by the receiving inductor 460 or the load 470 via the signal receiver.

The control circuit 430 according to an exemplary embodiment may receive a change request of a current flowing in the transfer inductor including data on a desired current, a desired voltage, and/or a desired power consumption of the inductor 460 or the load 470 included in the wireless power receiving device 120 through the signal receiver.

The control circuit 430 according to an exemplary embodiment may receive data from the wireless power receiving device 120 via the signal receiver using, for example, Bluetooth, ZigBee or other modulation methods of the or specification.

The control circuit 430 according to an exemplary embodiment may be configured to generate the control signal 340 based on the received information and/or data. For example, the control circuit 430 may generate the control signal 340 for adjusting the output DC voltage of the first DC power supply 210 based on the information and/or data received via the signal receiver. For example, the control circuit 430 may determine a desired output DC voltage of the first DC power supply 210. The desired output DC voltage according to an exemplary embodiment may provide a desired capacitance of a capacitor to acquire a predetermined operating frequency of the resonant circuit. In addition, the control circuit 430 may generate the control signal 340 based on the determined desired output DC voltage.

The control circuit 430 according to an exemplary embodiment may be configured to apply the generated control signal 340 to the first DC power supply 210. For example, the control circuit 430 may apply the control signal 340 to the first DC power supply 210 based on the received information and/or data and a control algorithm implemented in the control circuit 430.

Figure 5:
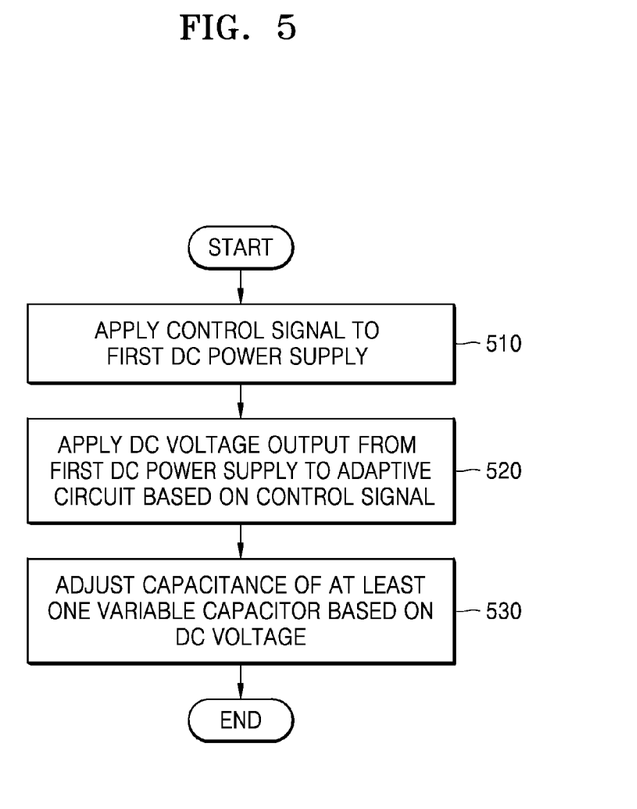
FIG. 5 is a flowchart illustrating a wireless power transfer method according to an exemplary embodiment.

FIG. 5 is a flowchart illustrating a wireless power transfer method according to an exemplary embodiment.

The method shown in FIG. 5 may be performed by each configuration of the wireless power transfer device 100 shown in FIG. 3 or 4. The wireless power transfer device 100 according to an exemplary embodiment may include an adaptive circuit including at least one variable capacitor and a first DC power supply.

In operation 510, the wireless power transfer device 100 according to an exemplary embodiment may apply a control signal to a first DC power supply included in the wireless power transfer device 100.

The wireless power transfer device 100 according to an exemplary embodiment may generate the control signal for adjusting an output DC voltage of the first DC power supply included in the wireless power transfer device 100.

The wireless power transfer device 100 according to an exemplary embodiment may include a control circuit including a signal receiver. The control circuit according to an exemplary embodiment may receive information and/or data through the signal receiver. The control circuit according to an exemplary embodiment may generate the control signal based on the received information and/or data.

The wireless power transfer device 100 according to an exemplary embodiment may apply the generated control signal to the first DC power supply of the wireless power transfer device 100. The control circuit according to an exemplary embodiment may apply the control signal to the first DC power supply included in the wireless power transfer device 100. The control circuit according to an exemplary embodiment may apply the control signal to the first DC power supply included in the wireless power transfer device 100 in form of a voltage signal or a current signal.

In operation 520, the wireless power transfer device 100 according to an exemplary embodiment may apply a DC voltage output from the first DC power supply to the adaptive circuit included in the wireless power transfer device 100 based on the control signal.

The wireless power transfer device 100 according to an exemplary embodiment may apply the control signal to the first DC power supply included in the wireless power transfer device 100 to adjust the output DC voltage of the first DC power supply. The wireless power transfer device 100 may also apply the DC voltage output from the first DC power supply to the adaptive circuit included in the wireless power transfer device 100. For example, the wireless power transfer device 100 may apply the DC voltage output from the first DC power supply to at least one variable capacitor included in the adaptive circuit.

In operation 530, the wireless power transfer device 100 according to an exemplary embodiment may adjust capacitance of the at least one variable capacitor based on the DC voltage.

The wireless power transfer device 100 according to an exemplary embodiment may adjust the capacitance of the at least one variable capacitor based on the DC voltage output from the first DC power supply. For example, the wireless power transfer device 100 may adjust impedance of a resonant circuit including at least one variable capacitor by adjusting the capacitance of the at least one variable capacitor. Further, the wireless power transfer device 100 may adjust amplitude of current flowing in a transfer inductor included in the resonant circuit by adjusting the impedance of the resonant circuit.

Figure 6:
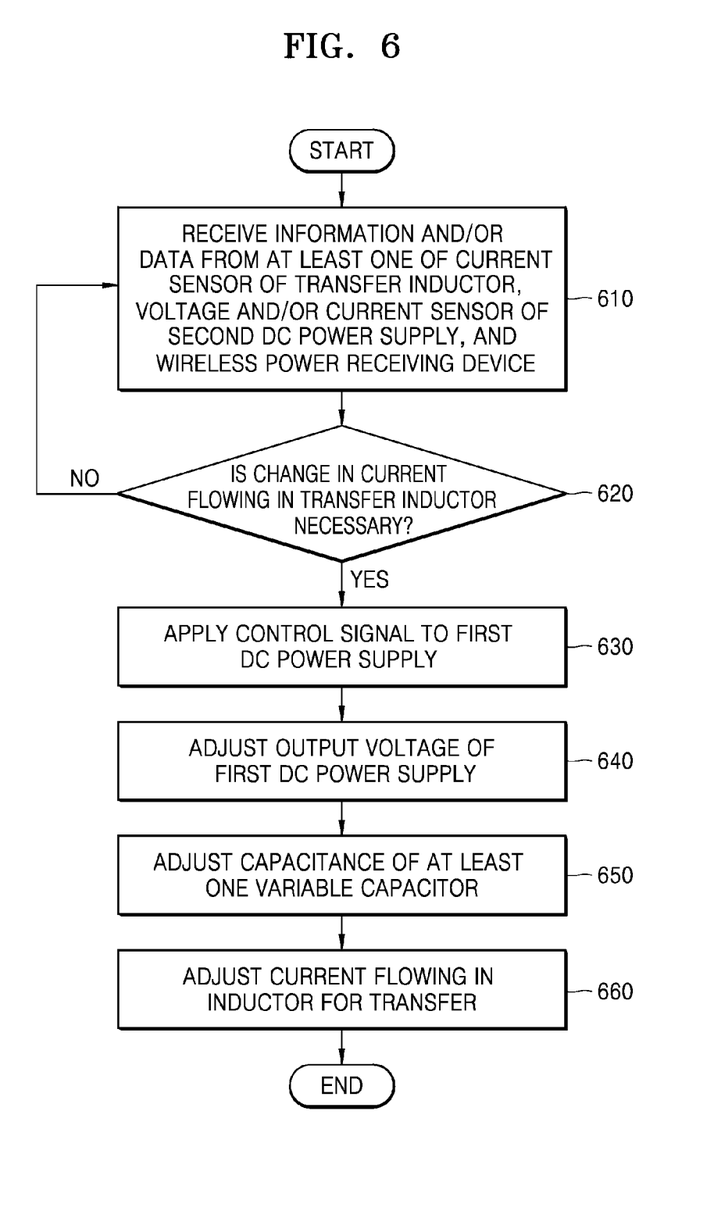
FIG. 6 is a flowchart illustrating a method of wirelessly transferring power performed by a wireless power transfer device according to an exemplary embodiment.

FIG. 6 is a flowchart illustrating a method of wirelessly transferring power performed by the wireless power transfer device 100 according to an exemplary embodiment.

The wireless power transfer device 100 according to an exemplary embodiment may include a resonant circuit including an adaptive circuit including at least one variable capacitor and a transfer inductor, and a first DC power supply. The wireless power transfer device 100 may also include a control circuit configured to apply a control signal generated based on received information and/or data to the first DC power supply. The wireless power transfer device 100 may also include a driving circuit configured to apply AC power to a resonant circuit based on DC power received from a second DC power supply.

In operation 610, the wireless power transfer device 100 may receive information and/or data from at least one of a current sensor of the transfer inductor, a voltage and/or a current sensor of the second DC power supply, and the wireless power receiving device 120. For example, the received data may include information and/or data regarding measured current and/or voltage.

The wireless power transfer device 100 according to an exemplary embodiment may include a current sensor for measuring current flowing in the transfer inductor. For example, the wireless power transfer device 100 may use the current sensor to measure the current flowing in the transfer inductor. Further, the control circuit may receive information on the current flowing in the transfer inductor. For example, the control circuit may receive information about the current flowing in the transfer inductor from a current sensor of the transfer inductor.

The wireless power transfer device 100 according to an exemplary embodiment may include a voltage sensor and/or a current sensor for measuring an output voltage and/or an output current of the second DC power supply.

The wireless power transfer device 100 according to an exemplary embodiment may measure the output voltage and/or the output current of the second DC power supply using the voltage sensor and/or the current sensor. The control circuit according to an exemplary embodiment may receive information about the output voltage and/or the output current of the second DC power supply. For example, the control circuit may receive information about the output voltage and/or the output current of the second DC power supply from the voltage sensor and/or the current sensor of the second DC power supply.

The control circuit according to an exemplary embodiment may receive data regarding current flowing in a receiving inductor or a load included in the wireless power receiving device 120 through the signal receiver. The control circuit according to an exemplary embodiment may receive data regarding a desired current of the receiving inductor or the load included in the wireless power receiving device 120.

In operation 620, the wireless power transfer device 100 according to an exemplary embodiment may determine whether a change in the current flowing in the transfer inductor is necessary based on the information and/or data received in operation 610. For example, the control circuit included in the wireless power transfer device 100 may determine whether the change in the current flowing in the transfer inductor is necessary.

The wireless power transfer device 100 according to an exemplary embodiment may determine whether the change in the current flowing in the transfer inductor is necessary, based on information about the current flowing in the transfer inductor.

The wireless power transfer device 100 according to an exemplary embodiment may determine whether the change in the current flowing in the transfer inductor is necessary, based on information about the output voltage and/or the output current of the second DC power supply.

The wireless power transfer device 100 according to an exemplary embodiment may determine whether the change in the current flowing in the transfer inductor is necessary depending on data on the current flowing in the receiving inductor or the load included in the wireless power receiving device. The wireless power transfer device 100 according to an exemplary embodiment may determine whether the change in the current flowing in the transfer inductor is necessary based on data regarding the desired current of the receiving inductor or the load included in the wireless power receiving device.

In operation 620, the wireless power transfer device 100 according to an exemplary embodiment may determine that it is not necessary to change the current flowing in the inductor for transfer and may return to operation 610 to repeat the process. Also, in operation 620, the wireless power transfer device 100 according to an exemplary embodiment may determine that the change in the current flowing in the inductor for transfer is necessary and may perform operation 630.

In operation 630, the wireless power transfer device 100 according to an exemplary embodiment may apply the control signal to the first DC power supply included in the wireless power transfer device 100. For example, the wireless power transfer device 100 may apply the control signal generated by the control circuit to the first DC power supply. For example, the wireless power transfer device 100 may apply the control signal to the first DC power supply in form of a voltage signal or a current signal.

In operation 640, the wireless power transfer device 100 may adjust the output voltage of the first DC power supply. For example, the wireless power transfer device 100 may adjust the output DC voltage of the first DC power supply by applying the control signal to the first DC power supply included in the wireless power transfer device 100. For example, the wireless power transfer device 100 may adjust the output DC voltage of the first DC power supply by applying the control signal in form of the voltage signal or the current signal to the first DC power supply.

In operation 650, the wireless power transfer device 100 according to an exemplary embodiment may adjust capacitance of at least one variable capacitor.

The wireless power transfer device 100 according to an exemplary embodiment may apply the output DC voltage of the first DC power supply to an adaptive circuit comprising the at least one variable capacitor. For example, the wireless power transfer device 100 may apply the output DC voltage of the first DC power supply to the at least one variable capacitor included in the adaptive circuit.

The wireless power transfer device 100 according to an exemplary embodiment may adjust the capacitance of the at least one variable capacitor by applying a DC voltage output from the first DC power supply to the adaptive circuit. For example, the wireless power transfer device 100 may adjust the capacitance of the at least one variable capacitor by applying the DC voltage output from the first DC power supply to the at least one variable capacitor.

The wireless power transfer device 100 according to an exemplary embodiment may adjust resonance characteristics of the resonant circuit including the at least one variable capacitor by adjusting the capacitance of the at least one variable capacitor. For example, the wireless power transfer device 100 may adjust the impedance of the resonant circuit including the at least one variable capacitor by adjusting the capacitance of the at least one variable capacitor.

In operation 660, the wireless power transfer device 100 according to an exemplary embodiment may adjust the current flowing in the inductor for transfer. For example, the wireless power transfer device 100 may adjust the current flowing in the transfer inductor by adjusting the capacitance of the at least one variable capacitor. For example, the wireless power transfer device 100 may maintain a driving frequency of a driving circuit coupled to the transfer inductor and adjust amplitude of the current flowing in the transfer inductor.

The wireless power transfer device 100 according to an exemplary embodiment may adjust power to be transferred to a wireless power receiving device by adjusting the current flowing in the transfer inductor. For example, the wireless power transfer device 100 may adjust the power transferred to the wireless power receiving device by adjusting the amplitude of the current flowing in the inductor for transfer.

Figure 7:
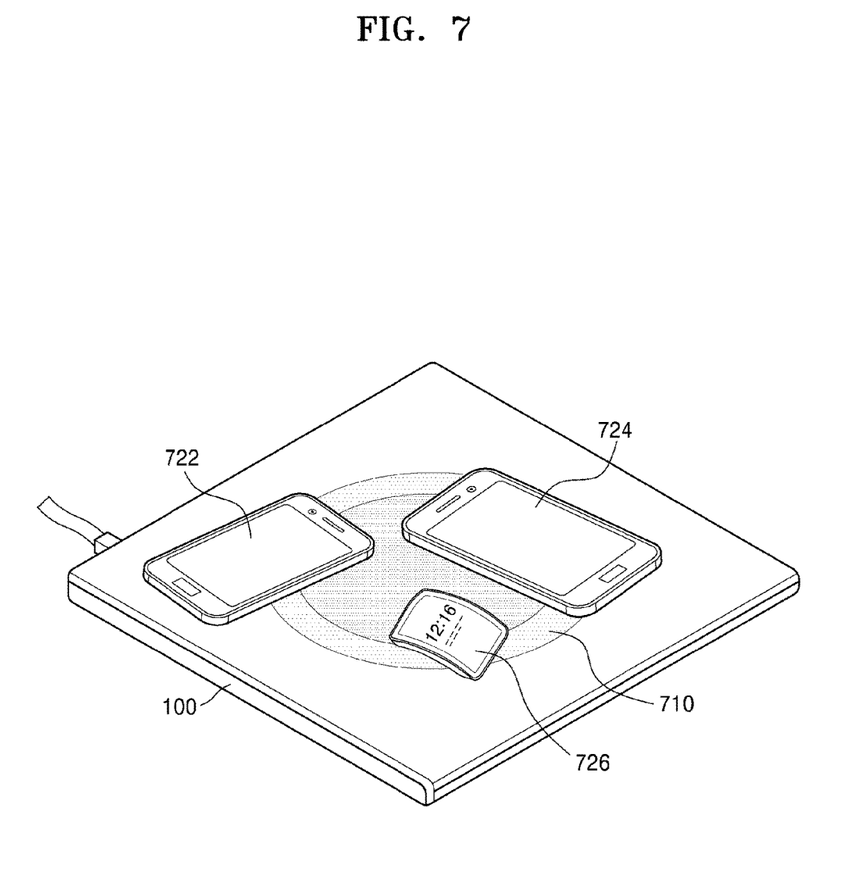
FIG. 7 is a diagram illustrating a wireless power transfer system according to an exemplary embodiment.

FIG. 7 is a diagram illustrating a wireless power transfer system according to an exemplary embodiment.

Referring to FIG. 7, a plurality of wireless power receiving devices, e.g., a device 722, a device 724, and a device 726, may be optionally located on a charging pad 710 of the wireless power transfer device 100.

A receiving inductor included in each of the plurality of wireless power receiving devices located on the charging pad 710 according to an exemplary embodiment, e.g., the device 722, the device 724, and the device 726, may be inductively coupled to a transfer inductor included in the power transfer device 100.

The wireless power transfer device 100 according to an exemplary embodiment may wirelessly transfer power to the plurality of wireless power receiving devices, e.g., the device 722, the device 724, and the device 726, through inductive coupling.

In FIG. 7, although only the plurality of wireless power receiving devices are disposed on the charging pad 710, the wireless power transferring device 100 may wirelessly transfer power to a plurality of wireless power receiving devices disposed in an area other than the charging pad 710. In addition, the wireless power transfer device 100 may wirelessly transfer power to a plurality of wireless power receiving devices physically away from the wireless power transfer device.

A wireless power transfer system according to an exemplary embodiment may provide more flexible positioning of a charged device relative to a charging device owing to improved power transfer efficiency in the wireless power transfer system designed to charge various devices at the same time without increasing its complexity and size.

Although the various embodiments of the present disclosure have been described in detail with reference to the accompanying drawings, it is to be understood that the present disclosure is not limited by the specific embodiments. In addition, the specific layout and design of the present disclosure, and the various modifications of the embodiments, are included in the present disclosure, as will be apparent to those skilled in the art based on the ordinary knowledge of the art and information contained in the detailed description.

Although not specifically mentioned, it should be understood that reference to storing data, programs, control algorithms, etc., implies the presence of a machine-readable media. Examples of machine-readable media include a read-only memory, random access memory, register, cache, solid-state storage, magnetic media such as internal hard disks and removable disks, magneto-optical and optical media such as CD-ROM and digital versatile discs (DVD), and any other storage media known in the art.

The application does not define specific hardware and software to implement the blocks in the drawings, but those skilled in the art will appreciate that the invention is not limited to a particular hardware or software implementation, and therefore any conventional hardware and/or software may be used to implement the invention. So, the hardware may be implemented in one or more application specific integrated circuits, digital signal processors, digital signal processing devices, programmable logic devices, field programmable gate arrays, processors, controllers, microcontrollers, microprocessors, electronic devices, other electronic modules configured to perform functions described in this document, computer, or a combination of the above.

Design of elements of the inventive device is known to those skilled in the art and is not described separately in this document, unless otherwise expressly stated. Elements of the device (e.g. housing) may be made of any suitable material, for example, and without limitation, aluminum, copper, stainless steel, titanium, carbon fiber composite materials, plastics, etc. These components may be manufactured using known methods, including, merely by way of example, machining and lost-wax casting. Operations of assembly, connection, etc. in accordance with the above description are also known to those skilled in the art and therefore will not be explained here in more detail.

Functional link of elements should be understood as a link that provides correct cooperation of the elements with each other and realization of a particular functionality of the elements. Particular examples of functional link may include a link that has the ability to exchange information, the ability to transfer electric current, the ability to transfer mechanical motion, the ability to transfer light, sound, electromagnetic or mechanical vibrations, etc. Specific form of functional link is defined by the nature of cooperation of said elements, and, unless otherwise expressly stated, is provided by conventional means using known principles.

In an exemplary embodiment, elements/units of the proposed WPT device are enclosed in a common housing, disposed on the same frame/circuit board and connected to each other structurally by mounting (assembly) works and functionally via communication links. The communication links or channels, unless otherwise expressly stated, are conventional standard communication links, and no creative effort is required to materially implement them. The communication link may be wire, set of wires, bus, path, wireless communication link (inductive, radio frequency, infrared, ultrasonic, etc.). Protocols for communication over communications links are known in the art and not disclosed separately.

Functionality of an element specified in the description or the claims as a single element may be implemented in practice by several components of the device, and vice versa, functionality of elements specified in the description or claims as multiple elements may be implemented in practice by a single component.

It should be understood that although such terms as "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. So, a first element, component, region, layer or section may be defined as a second element, component, region, layer or section without going beyond the scope of the present invention. In the present description the term "and/or" includes any and all combinations of one or more of respective listed items. Elements referred to in the singular do not exclude a plurality of elements, unless otherwise expressly stared.

It should be understood that although such terms as "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. So, a first element, component, region, layer or section may be defined as a second element, component, region, layer or section without going beyond the scope of the present invention. In the present description the term "and/or" includes any and all combinations of one or more of respective listed items. Elements referred to in the singular do not exclude a plurality of elements, unless otherwise expressly stated.

The present disclosure relates to an apparatus and a method for wirelessly transferring power through inductive coupling according to various embodiments, and more particularly, provides a wireless power transfer apparatus and method for adjusting transfer power that does not significantly increase system cost while increasing efficiency of an overall system.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A device for wirelessly transferring power to an external device, the device comprising:
   a resonant circuit comprising an adaptive circuit comprising at least one variable capacitor and a first inductor inductively coupled to the external device and configured to transfer the power to the external device using inductive coupling; and
   a first direct current (DC) power supply configured to apply a controllable variable output DC voltage to the adaptive circuit based on a control signal,
   wherein a capacitance of the at least one variable capacitor is adjusted based on the controllable variable output DC voltage applied to the adaptive circuit.

2. The device of claim 1, further comprising: a control circuit configured to generate the control signal and apply the generated control signal to the first DC power supply.

3. The device of claim 2, further comprising: a first current sensor configured to measure current flowing in the first inductor,
   wherein the control circuit is further configured to receive information about the measured current flowing in the first inductor and generate the control signal based on the received information.

4. The device of claim 2,
   wherein the control circuit comprises a signal receiver,
   wherein the first inductor is inductively coupled to a second inductor of the external device, and
   wherein the control circuit is further configured to receive data regarding current flowing in the second inductor through the signal receiver and generate the control signal based on the received data.

5. The device of claim 2,
   wherein the control circuit comprises a signal receiver, and
   wherein the control circuit is further configured to receive, through the signal receiver, data regarding current flowing in a load of the external device and generate the control signal based on the received data.

6. The device of claim 2, further comprising:
   a second DC power supply; and
   a driving circuit configured to receive DC power output from the second DC power supply and supply alternating current (AC) power to the resonant circuit.

7. The device of claim 6, wherein the driving circuit is configured to convert the received DC power into the AC power.

8. The device of claim 6, further comprising: at least one of a voltage sensor measuring an output voltage of the second DC power supply and a second current sensor measuring an output current,
   wherein the control circuit is further configured to receive at least one piece of information among information about the measured output voltage and the measured output current and generate the control signal based on the received at least one piece of information.

9. The device of claim 1, wherein the at least one variable capacitor is in series or in parallel to the first inductor.

10. The device of claim 1, wherein the at least one variable capacitor is one of a ferroelectric capacitor and a liquid crystal capacitor.

11. The method of claim 1, wherein the at least one variable capacitor is one of a ferroelectric capacitor and a liquid crystal capacitor.

12. A wireless power transfer method in which a wireless power transfer device comprising a resonant circuit comprising an adaptive circuit comprising at least one variable capacitor and a first inductor, and a first DC power supply wirelessly transfers power to an external device, the method comprising:
   applying a generated control signal to the first DC power supply;
   applying a controllable variable output DC voltage output from the first DC power supply to the adaptive circuit based on the generated control signal;
   adjusting a capacitance of the at least one variable capacitor based on the controllable variable output DC voltage; and
   transferring wireless power through the first inductor based on the adjusted capacitance.

13. The method of claim 12, wherein the applying of the generated control signal to the first DC power supply comprises:
    measuring current flowing in the first inductor; and
    generating the control signal based on information about the measured current flowing in the first inductor.

14. The method of claim 12, wherein the applying of the generated control signal to the first DC power supply comprises:
    receiving data regarding current flowing in a second inductor through the external device inductively coupled to the first inductor; and
    generating the control signal based on the received data.

15. The method of claim 12, wherein the applying of the generated control signal to the first DC power supply comprises:
    receiving data regarding current flowing in a load of the external device; and
    generating the control signal based on the received data.

16. The method of claim 12, wherein the wireless power transfer device further comprises a driving circuit configured to receive DC power output from a second DC power supply and supply AC power to the resonant circuit,
    wherein the applying of the generated control signal to the first DC power supply comprises:
    measuring at least one of an output voltage and an output current of the second DC power supply; and
    generating the control signal based on at least one piece of information among data regarding the measured output voltage and information about the measured output current.

17. The method of claim 12, wherein the at least one variable capacitor is in series or in parallel to the first inductor.

18. A computer program product comprising a non-transitory computer readable recording medium,
    wherein the non-transitory computer readable recording medium comprises a computer program command for performing a power transfer method performed by a wireless power transfer device comprising a resonant circuit comprising an adaptive circuit comprising at least one variable capacitor and a first inductor, and a first DC power supply and wirelessly transferring power to an external device, and
    wherein the power transfer method comprises:
    applying a generated control signal to the first DC power supply;
    applying a controllable variable output DC voltage output from the first DC power supply to the adaptive circuit based on the generated control signal;
    adjusting a capacitance of the at least one variable capacitor based on the controllable variable output DC voltage; and
    transferring wireless power through the first inductor based on the adjusted capacitance.

* * * * *